Figure 1:
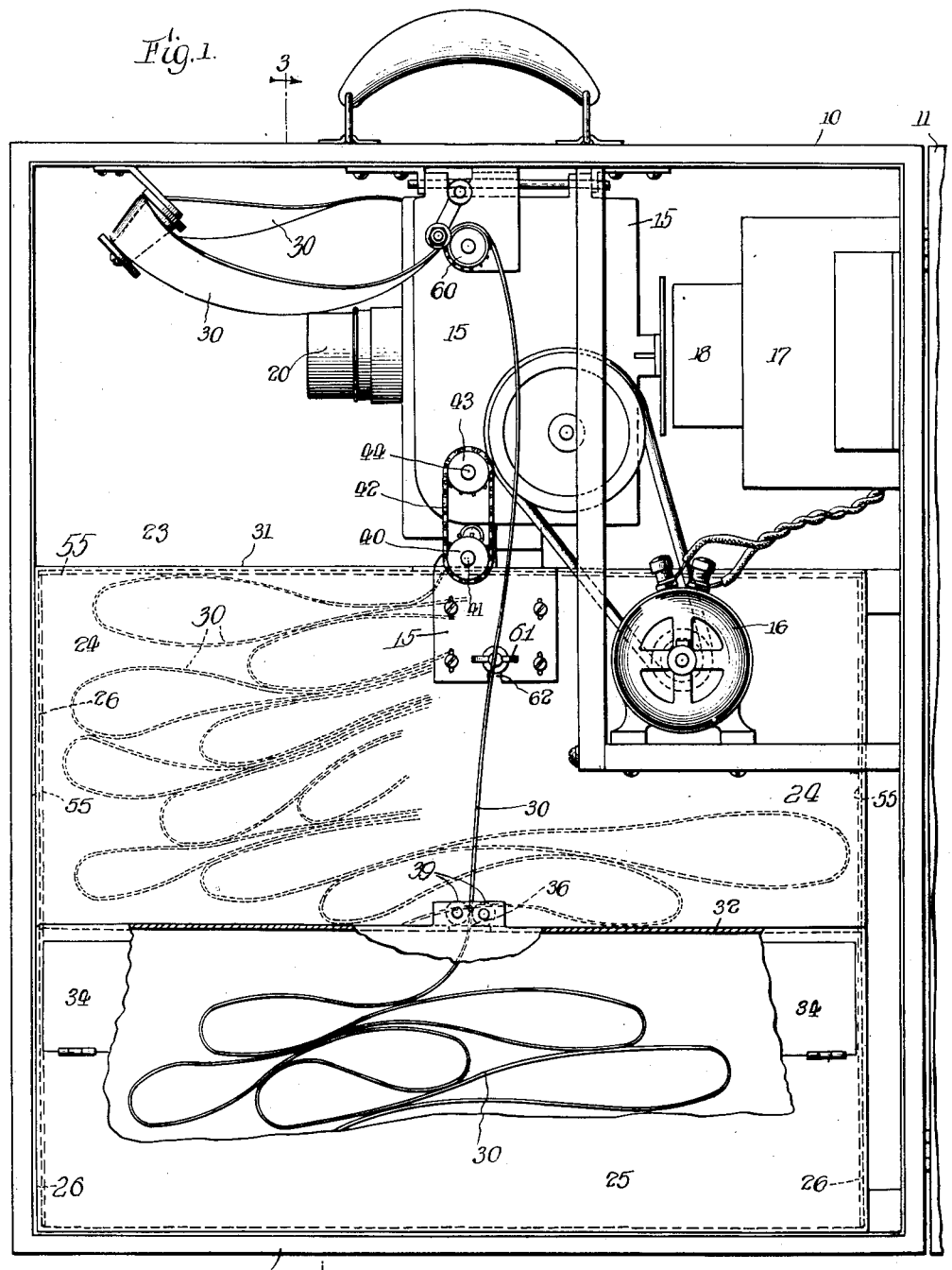

Feb. 10, 1925.

O. J. HOLMES

MOTION PICTURE APPARATUS

Filed April 10, 1922

1,525,939

3 Sheets-Sheet 1

Witness:
(T.J.) Sauser

Inventor
Oscar J. Holmes
By Luther Johns, Atty.

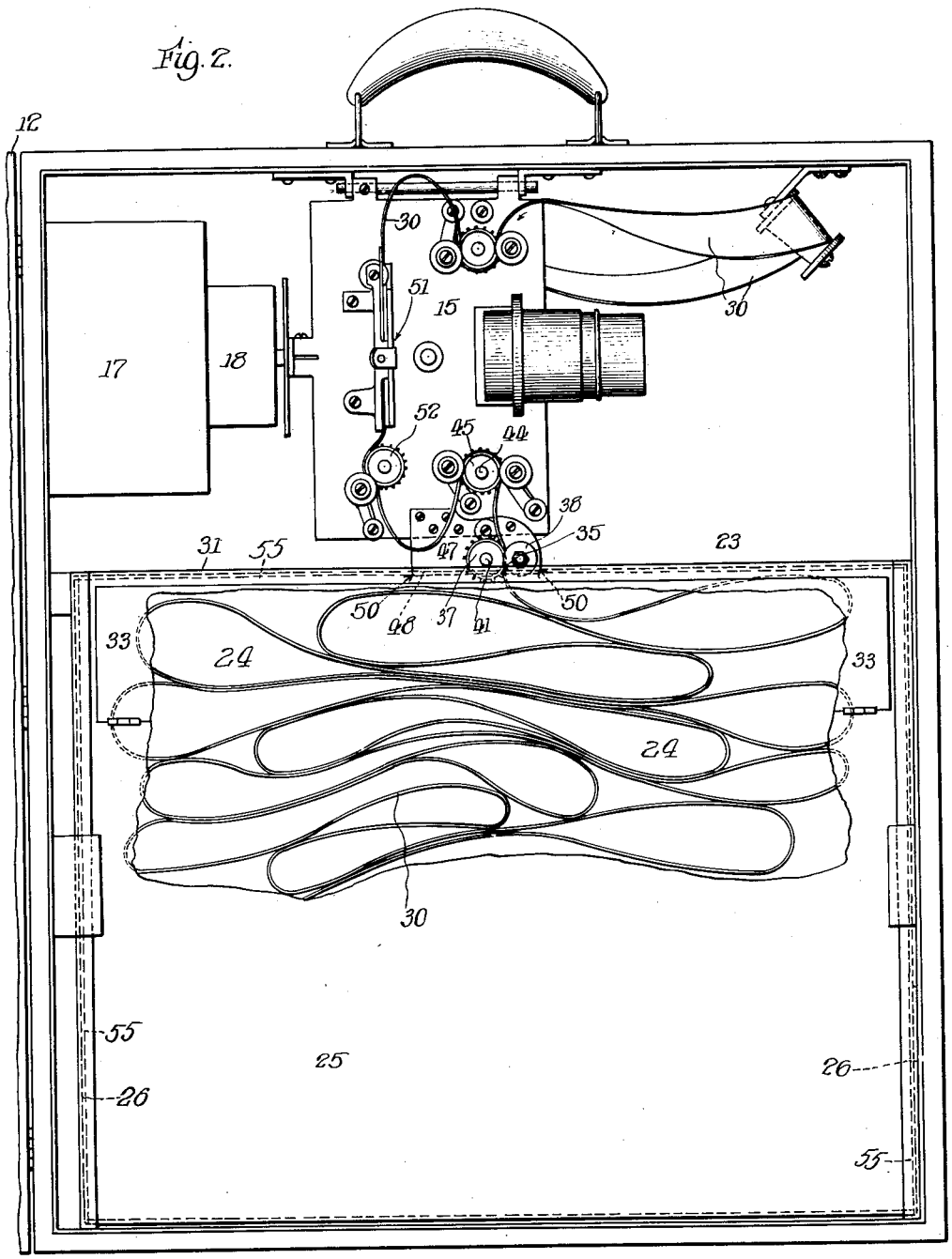

Feb. 10, 1925.
O. J. HOLMES
1,525,939
MOTION PICTURE APPARATUS
Filed April 10, 1922    3 Sheets-Sheet 3
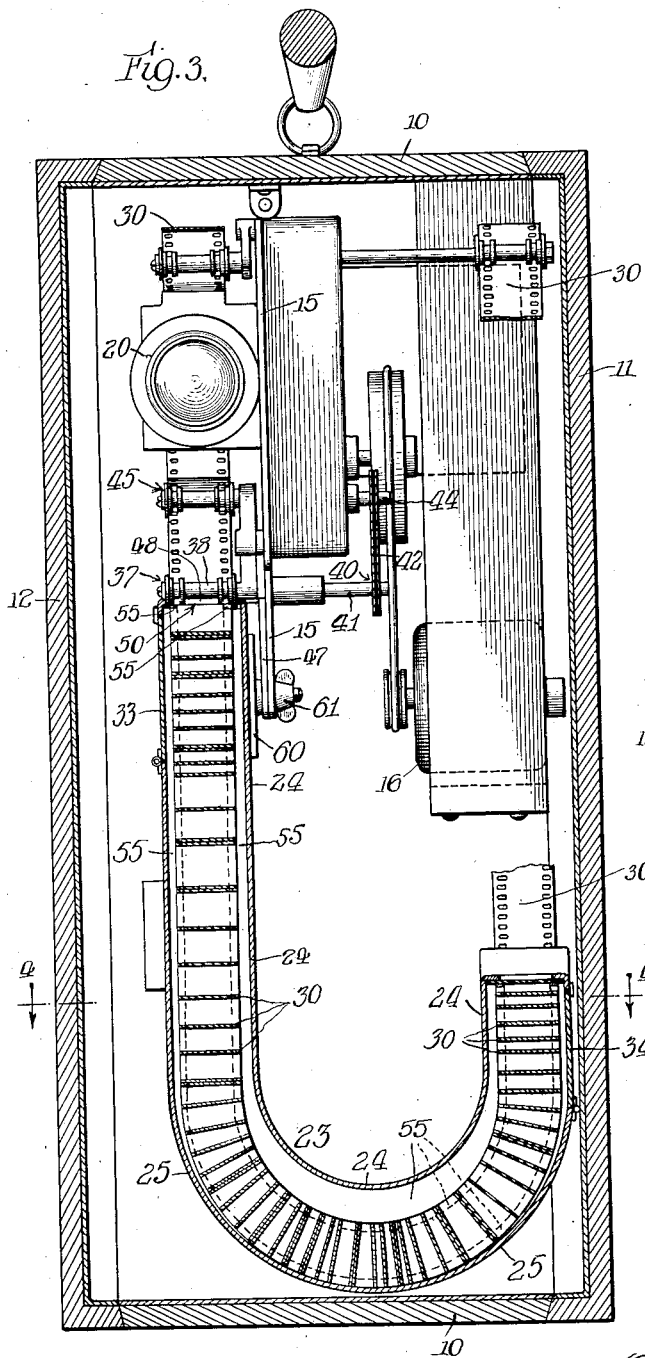
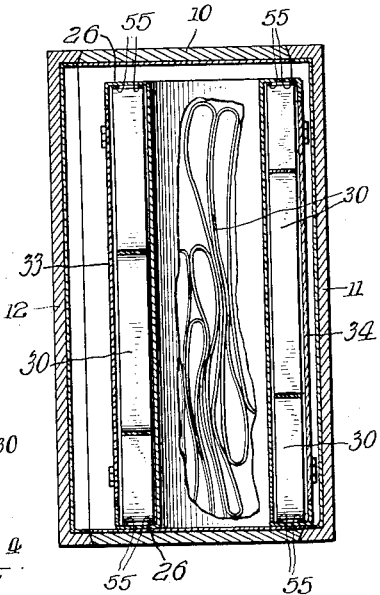

Patented Feb. 10, 1925.

1,525,939

UNITED STATES PATENT OFFICE.

OSCAR J. HOLMES, OF CHICAGO, ILLINOIS.

MOTION-PICTURE APPARATUS.

Application filed April 10, 1922. Serial No. 551,333.

*To all whom it may concern:*

Be it known that I, OSCAR J. HOLMES, a citizen of the United States, residing in Chicago, Cook County, Illinois, have invented certain new and useful Improvements in Motion-Picture Apparatus, of which the following is a specification.

These improvements relate to means for receiving and dispensing a motion picture film of the endless-band or continuous kind, and to motion picture machines embodying such film-holding means.

It is not new to employ an endless band film in the motion picture art. Some prior suggestions for continuous projection have included reels or coils from which the inner layer of film is continuously withdrawn while another portion of the film is being continuously added as an outer layer. Some very old suggestions are the use of boxes or receptacles into which the film is fed in layers or loops and withdrawn from another portion of the container. The present improvements are in the latter class.

Among the many difficulties heretofore experienced in continuous projection is the important one that the withdrawal of the film from the coil or container has required a considerable amount of pulling strain, usually, if not always, by means of sprockets having teeth entering marginal lines of openings in the film, with the result that in a comparatively short period of use here and there on the film breakages occur at these marginal holes. Another disadvantage in some forms of such prior devices has been that the film layers are imposed upon each other so tightly that the necessary slippage between layers injures the picture-coating of the film. A third important objection has been in the fact that the film has often been caused to bend on curves of such small radius as to break the cemented connection between patches or between portions of the film joined together. Still another objection to some forms heretofore suggested has been the size of the container, and this has been particularly true of devices in which the film is fed loosely into a receptacle in overlapped relation.

The principal objects of the present invention are the provision of a simple form of device which is notably free of all and several the objections hereinabove pointed out, to the end that a relatively large amount of film may be stored and operated upon while occupying relatively small space and in which undue breakage and defacement of the film are avoided. It is an object to provide a form of container within which an endless film may be initially stored and distributed to the user, the container and the projector with which it is adapted to be used having provisions whereby the container may readily be installed in association with the projector for use; and to provide a form of container within which the film may be easily positioned and from which it may readily be removed. It is a prime object to provide a motion picture projector in which a continuous film may be operated successfully and satisfactorily without undue wear and tear upon the film. Still other objects and advantages will appear hereinafter.

In the accompanying drawings, which form a part of this specification, Figure 1 is a face view of a motion picture projector of the "suit-case" type, a portion of the film-receiving-and-dispensing container being broken away; Fig. 2 is a similar view showing the opposite side of the device, a wall of the film receptacle being also broken away; Fig. 3 is a vertical section transverse of the view of Figs. 1 and 2 as on the line 3—3 of Fig. 1; and Fig. 4 is a horizontal section through the container as on the line 4—4 of Fig. 3, a portion of the container wall being also broken away.

The case or cabinet 10 may be considered as of ordinary construction and has a front door 11, Fig. 1, and a rear door 12, Fig. 2, shown there in fragmentary form. The case may conveniently be of such dimensions as twenty-four inches by twenty inches by twelve inches, but the proportions may be varied and the container may be used with other kinds of projectors. The projector mechanism within or carried by the frame or housing 15 operated by the motor 16, the lamp housing 17, the extension 18 for condensing lenses, and the projecting lens tube 20 may be considered as being of a well-known form. For present purposes it is unnecessary to illustrate or describe the details of the film-moving and picture-projecting parts.

Beneath the projection apparatus and within the case 10 is the film-receiving-and-dispensing receptacle 23 which is shown as comprising a channel defined by an inner wall 24, an outer wall 25 and end walls 26, the inner and outer walls being spaced apart only such a distance that a film as 30, which is to be understood as being of the usual kind employed in the motion picture art, may freely and loosely become positioned within the hollow interior of the receptacle with the edges of the film so close to the inner and outer walls of the receptacle that by no possibility will more than one layer of film find itself between the opposite walls at any given place. Thus, if the film be one and three-eighths inches wide the inner and outer walls may be spaced apart say one and three-fourths inches at its narrowest places. From Fig. 3 it will be observed that at the bottom portion of the receptacle the distance between the side walls is somewhat greater than at other places, and here the spacing apart at the widest place may suitably be say two inches. The hollow interior or channel is preferably made wider between the side walls at the bottom of the receptacle to facilitate the movement of the film around the bend at this bottom part. The channel-like interior of the film receptacle is thus relatively narrow in cross-view, as in Fig. 3, and is relatively long as viewed at right angles to the view of Fig. 3. It is substantially U-shaped in transverse view, but the intake side of the structure is longer and stands higher than the outlet side.

The film receptacle 23 has a top or cover 31 for one side portion and a similar top or cover 32 for the other. There is a side door 33 for the intake portion and a similar door 34 for the outlet portion, these doors being opened when it is desired to insert a film in the device. When in use the film enters through the upper wall 31 at 35 and emerges from a slot-like opening at 36 in the top wall 32. Rollers 39 at the opening 36 insure a free and safe movement of the film there.

The film receptacle 33 is thus shown as a complete housing for the film except for the openings where the film enters and emerges. It is preferably a substantially complete housing so as to protect the film within the compartment from fire, if through negligence or for any other reason the film should become ignited. As a complete housing it also provides a suitable case in which the film may be safely transported, as from the producer to the user and back again after the leasing period is over; and it also protects the film from dirt and dust. In some instances, however, satisfactory results could be had without the employment of such a complete housing as I have shown, and the invention is not limited to the housing shown either as to exact form or construction. In my practice the compartment 23 is of sheet metal.

The shaft 41 and sprocket 37, Fig. 2, are carried by a bracket 47 secured to the side plate of the projecting head mechanism 15, which bracket 47 has a plate-like bottom part 48 which fits into an opening at 50 in the top wall 31 of the film receptacle.

The sprocket 37 is rotated with a continuous motion by means of a sprocket 40 on the shaft 41, Fig. 1, and the chain 42 traveling upon a sprocket 43 on a shaft 44, which shaft 44, as will be noted from Fig. 2, carries the take-up sprocket 45 which is to be understood as being operated with a continuous motion at the required relative rate. The feeding of the film into the receptacle 23 is at the same rate as the travel of the film through the projecting machine.

The film 30 emerging from the receptacle at 36, Fig. 1, passes between various sprockets and rollers as well shown in Figs. 1 and 2, past the projection opening at about 51, Fig. 2, going thence to the intermittent sprocket 52, which provides the intermittent step-by-step pull upon the film, thence to the take-up sprocket 45, and thence to the sprocket 37 which feeds the film directly into the hollow interior of the receptacle 23, and this sprocket 37 immediately at the entrance opening insures the feeding of the film into the container.

Once within the container the film, acting under the pushing force of the sprocket 37, moves with a crawling motion toward one end or the other of the receptable in the line of least resistance, and when the resistance for any reason in one direction becomes greater than the flexible and easily-bending film can overcome the film bends in the opposite direction near the intake opening and a loop of film crawls out toward the other end of the container. The loop will sometimes extend all the way to the end of the container and sometimes only part of the way.

While the film is being fed into the higher extension or side of the receptacle the film is constantly moving downward bodily as a mass, and thus more space is constantly being provided for incoming film. At the intake there is a constant rolling and overlapping back and forth of the film on easy natural lines, as well illustrated in Fig. 2. As the same amount of film is constantly being withdrawn there is no crowding of the film at any place or time.

It will be noted that the film at all times presents its edges to the side walls of the device, and its sliding is upon its edges or at least upon one edge. The lower portion of the container is rounded so that the film may easily move in the lateral direction, and when so moving the film travels only on its then lower edge, and the film is standing substantially vertical at the bottom of the device.

The entrance side of the receptacle is preferably considerably higher than is the delivery side so that there is always a greater weight of film on that side than on the delivery side whereby through the action of gravitation some film is always forced around the bend of the U-shaped portion in its overlapped and loop-shaped condition and moves upward toward the outlet when the device is in use. The folding upon each other at the intake is such that the film is not materially pressed upon at the bends of the loops and it maintains its loop-like form on substantially large radii throughout the whole course of its travel.

An important result of the construction is that at the delivery end of the conduit the layers of film are lying very freely and lightly upon each other so that their withdrawal from the device requires substantially no more pull by a sprocket as 60, Fig. 1, than is sufficient to lift that small amount of film and consequently all strains tending to rupture the film are avoided.

In practice the two sides, legs or extensions of the container may vary in height and length between the end walls to accommodate films of various lengths. The intake side may be increased in height quite materially without changing the height of the delivery side, but the delivery side may be increased in height also, within such limits as will maintain the condition of more weight of film on the intake side than on the delivery side and sufficiently more to insure the gravitational downward movement of the film on the intake side. In my practice, using ordinary commercial film, I find that where the receptacle is maintained substantially full of film, as shown by the drawings, the film will not crawl laterally in its loop-forming movement much beyond ten inches on each side of the middle where the film enters, and a container of about twenty inches between its end walls will meet ordinary conditions.

In order to protect the face of the film at the end walls 26 and also at the top walls 31 and 32 I provide pairs of spaced-apart strips or extensions 55 along these walls adapted to engage the film at its edge portions and prevent the picture part of the film from rubbing against these walls.

For holding the container 23 readily removable in its operative position I have shown a thickening and strengthening plate 60 secured to the middle upper end portion the inner side wall 24, which plate is to be understood as being bored and threaded for the wing bolt 61 which is accommodated in a slot 62 in a depending support comprising an extension of the plate 15 and bracket 47 secured together.

The invention is not limited to what is specifically herein illustrated and described, and reference should be had to the appended claims to determine the scope of the improvements herein set forth.

I claim:

1. In a film-receiving-and-dispensing device for a film of the character described, the combination of means for holding loosely for free bodily movement downward throughout a portion of its travel a section of such film in a plurality of loop-shaped layers overlapped one upon the other, and for free bodily movement laterally while traveling on and being supported by an edge of the film throughout another portion of its travel and with the film at all places of travel maintaining its overlapped relation.

2. In a film-receiving-and-dispensing device for a film of the character described, the combination of means for holding loosely for free bodily movement downward through a portion of its travel a section of such film in a pluarilty of loop-shaped layers overlapped one upon the other, and for free bodily movement laterally and then upwardly throughout other portions respectively of its travel while maintaining its overlapped relation and with the film resting on one edge portion thereof at the place where the film moves laterally.

3. In a film-receiving-and-dispensing device for a film of the character described, the combination of means forming a channel substantially U-shaped in vertical cross section, the channel being relatively narrow as viewed in such cross section and being relatively long as viewed in a section at right angles to said vertical cross section, and being adapted to hold a film in loop-shaped layers with one edge of the film adjacent to one side of the channel-forming means.

4. In a film-receiving-and-dispensing device for a film of the character described, the combination of oppositely disposed sheet-like side walls forming a channel-like receptacle for holding loosely for free bodily movement downward throughout a portion of its travel a section of such film in a plurality of loop-shaped layers overlapped one upon the other, said walls being curved laterally at the lower portions thereof and extending thence upward, thus forming a channel structure having two upwardly extending portions, one of said portions being materially longer than the other, the hollow interior of the receptacle being relatively long and narrow as viewed from the top.

5. In a film-receiving-and-dispensing device for a film of the character described, the combination of housing walls forming a substantially closed channel substantially U-shaped in vertical cross section with two upwardly extending portions and a rounded bottom portion, the channel being relatively narrow as viewed in such cross section and being relatively long as viewed in a section at right angles to said vertical cross section, one of said upwardly-extending portions being materially longer than the other, there being an opening for the film in each of said upwardly-extending portions at the top thereof.

6. In a motion picture projector the combination of film-moving means, a film receiving receptacle below the film-moving means, said receptacle being of such width as to accommodate freely a plurality of layers of film one upon another and having a portion which extends downward, and having a portion which curves laterally from the bottom of the downwardly-extending portion and within which the layers of film may move bodily substantially at right angles to the downward movement thereof and while resting on edge portions of the film, and having a portion which thence extends upward a less distance than the height of the downwardly-extending portion, and means substantially at the top of the downwardly-extending portion for feeding the film into said receptacle, there being a discharge opening for the film at the top of said upwardly-extending portion.

OSCAR J. HOLMES.